US010519881B2

(12) United States Patent
Conte et al.

(10) Patent No.: US 10,519,881 B2
(45) Date of Patent: Dec. 31, 2019

(54) COMPRESSOR PRESSURE RATIO CONTROL (71) Applicant: GM Global Technology Operations LLC, Detroit, MI (US)

(72) Inventors: Giuseppe Conte, Turin (IT); Vincenzo Alfieri, Turin (IT); Francesco Castorina, Turin (IT); Stefano Sarinelli, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/953,854

(22) Filed: Apr. 16, 2018

(65) Prior Publication Data

US 2019/0316533 A1 Oct. 17, 2019

(51) Int. Cl.
*F02D 41/00* (2006.01)
*F02D 41/14* (2006.01)

(52) U.S. Cl.
CPC ..... *F02D 41/0007* (2013.01); *F02D 41/1401* (2013.01); *F02D 2041/1409* (2013.01); *F02D 2041/1433* (2013.01)

(58) Field of Classification Search
CPC ...... F02D 41/00; F02D 41/0007; F02D 41/14; F02D 41/1401; G06F 7/70; G06F 19/00

USPC ......... 701/102–104, 106, 107, 110, 114–115
See application file for complete search history.

(56) References Cited

U.S. PATENT DOCUMENTS

| | | | | |
|---|---|---|---|---|
| 2010/0100300 A1* | 4/2010 | Brooks | ............... | F02B 73/00 701/102 |
| 2013/0186060 A1* | 7/2013 | Kosheleff | ............. | F02K 3/06 60/224 |
| 2014/0067230 A1* | 3/2014 | Liu | ................. | F02D 41/0007 701/102 |
| 2016/0146130 A1* | 5/2016 | Haskara | ............ | F02D 41/005 701/108 |

* cited by examiner

*Primary Examiner* — John Kwon
*Assistant Examiner* — Johnny H Hoang
(74) *Attorney, Agent, or Firm* — Cantor Colburn LLP (57) ABSTRACT

Embodiments of the present invention described herein include a control system for a vehicle. The control system includes a control module that dynamically computes a first power value ($P_C$) to be generated by a compressor based on an estimation model of the compressor. The control system further includes a power term estimator module that dynamically computes a second power value ($P_U$) based on a measured compressor pressure ratio ($\beta c^{meas}$) of the compressor. The control module further computes an amount of power to be generated by an engine ($Pt^{des}$) by adding the first power value and the second power value. The control module further adjusts an actuator position to generate the amount of power to be generated.

20 Claims, 5 Drawing Sheets

COMPRESSOR PRESSURE RATIO CONTROL

INTRODUCTION

The present disclosure relates to internal combustion engines, and more particularly to controlling compressor power ratio for turbocharged internal combustion engines.

Engine control includes control of parameters in the operation of an engine based upon a desired engine output, including an engine speed and an engine load, and resulting operation, for example, including engine emissions. Parameters controlled by engine control methods include air flow, fuel flow, and intake and exhaust valve settings.

Boost air can be provided to an engine to provide an increased flow of combustion air to the engine relative to a naturally aspirated intake system to increase the output of the engine. A turbocharger utilizes energy in an exhaust system of the engine to drive a compressor providing boost air to the engine. Exemplary turbochargers can include variable geometry turbochargers (VGT), enabling modulation of boost air provided for given conditions in the exhaust system. A supercharger utilizes mechanical power from the engine, for example as provided by an accessory belt, to drive a compressor providing boost air to the engine. Engine control methods control boost air in order to control the resulting combustion within the engine and the resulting output of the engine.

Exhaust gas recirculation (EGR) is another parameter that can be controlled by engine controls. An exhaust gas flow within the exhaust system of an engine is depleted of oxygen and is essentially an inert gas. When introduced to or retained within a combustion chamber in combination with a combustion charge of fuel and air, the exhaust gas moderates the combustion, reducing an output and an adiabatic flame temperature. EGR can also be controlled in combination with other parameters in advanced combustion strategies, for example, including homogeneous charge compression ignition (HCCI) combustion. EGR can also be controlled to change properties of the resulting exhaust gas flow. Engine control methods control EGR in order to control the resulting combustion within the engine and the resulting output of the engine.

Air handling systems for an engine manage the flow of intake air and EGR into the engine. Air handling systems must be equipped to meet charge air composition targets (e.g. an EGR fraction target) to achieve emissions targets, and to meet total air available targets (e.g. the charge flow mass flow) to achieve desired power and torque targets. The actuators that most strongly affect EGR flow generally affect charge flow, and the actuators that most strongly affect charge flow generally affect EGR flow. Therefore, an engine with a modern air handling system presents a multiple input multiple output (MIMO) system with coupled input-output response loops.

MIMO systems, where the inputs are coupled, i.e. the input-output response loops affect each other, present well known challenges in the art. An engine air handling system presents further challenges. The engine operates over a wide range of parameters including variable engine speeds, variable torque outputs, and variable fueling and timing schedules. In many cases, exact transfer functions for the system are unavailable and/or the computing power needed for a standard decoupling calculation is not available.

SUMMARY

Embodiments of the present invention described herein include a control system for a vehicle. The control system includes a control module that dynamically computes a first power value ($P_C$) to be generated by a compressor based on an estimation model of the compressor. The control system further includes a power term estimator module that dynamically computes a second power value ($P_U$) based on a measured compressor pressure ratio ($\beta c^{meas}$) of the compressor. The control module further computes an amount of power to be generated by an engine ($Pt^{des}$) by adding the first power value and the second power value. The control module further adjusts an actuator position to generate the amount of power to be generated.

In one or more examples, the control module is further computes the amount of power to be generated by the engine by adding a third power value (PID) to the first power value ($P_C$) and the second power value ($P_U$).

The power term estimator module computes the second power value ($P_U$) in parallel with the first power value ($P_C$). Computing the second power value ($P_U$) by the power term estimator module includes computing an estimated compressor pressure ratio ($\beta c^{est}$). The power term estimator computes the estimated compressor pressure ratio ($\beta c^{est}$) using a closed loop operation by computing $\beta c^{est}\ c(P_t - \eta_m P_c + P_U)$, where c is a predetermined value, $P_t$ is an amount of power generated by the engine, $P_c$ is an estimated amount of power generated by the compressor, $P_U$ is the second power value generated in a previous iteration, and $\eta_m$ is a mechanical efficiency of the compressor.

In one or more examples, computing the second power value ($P_U$) by the power term estimator module includes computing $$P_U = \frac{k_2}{c} k_1 (\beta_c^{meas} - \beta_c^{est}),$$

where $k_1$ and $k_2$ are predetermined values. The power term estimator computes the second power value ($P_U$) in response to the control module being operating in a closed loop mode.

Embodiments of the present invention further include a method for generating power by an engine. The method includes computing, by a control module, a first power value ($P_C$) to be generated by a compressor based on an estimation model of the compressor. The method further includes computing, by a power term estimator module, a second power value ($P_U$) based on an estimated power compressor pressure ratio ($\beta c^{est}$) based on a measured compressor pressure ratio ($\beta c^{meas}$) of the compressor. The method further includes computing, by the control module, an amount of power to be generated by the engine ($Pt^{des}$) by adding the first power value and the second power value. The method further includes adjusting, by the control module, a piston position to generate the amount of power to be generated.

In one or more examples, the method further includes computing, by the control module, the amount of power to be generated by the engine by adding a third power value (PID) to the first power value ($P_C$) and the second power value ($P_U$).

The power term estimator module computes the second power value ($P_U$) in parallel with the first power value ($P_C$). Computing the second power value ($P_U$) by the power term estimator module includes computing an estimated compressor pressure ratio ($\beta c^{est}$). The power term estimator computes the estimated compressor pressure ratio ($\beta c^{est}$) using a closed loop operation by computing $\beta_c^{est} = c(P_t - \eta_m P_c + P_U)$, where c is a predetermined value, $P_t$ is an amount of power generated by the engine, $P_c$ is an estimated amount of power generated by the compressor, $P_U$ is the second power value generated in a previous iteration, and $\eta_m$ is a mechanical efficiency of the compressor.

In one or more examples, computing the second power value ($P_U$) by the power term estimator module includes computing $$P_U = \frac{k_2}{c} k_1 (\beta_c^{meas} - \beta_c^{est}),$$

where $k_1$ and $k_2$ are predetermined values. The power term estimator computes the second power value ($P_U$) in response to the control module being operating in a closed loop mode.

Embodiments of the present invention further include an engine system that includes an engine, a turbocharger that includes a compressor, a control module, and a power term estimator module. The control module dynamically computes a first power value ($P_C$) to be generated by the compressor based on an estimation model of the compressor. The power term estimator module dynamically computes a second power value ($P_U$) based on a measured compressor pressure ratio ($\beta c^{meas}$) of the compressor. The control module computes an amount of power to be generated by the engine system ($Pt^{des}$) by adding the first power value and the second power value. The control module adjusts a piston position to generate the amount of power to be generated.

In one or more examples the control module further computes the amount of power to be generated by the engine by adding a third power value (PID) to the first power value ($P_C$) and the second power value ($P_U$).

The power term estimator module computes the second power value ($P_U$) in parallel with the first power value ($P_C$). Computing the second power value ($P_U$) by the power term estimator module includes computing an estimated compressor pressure ratio ($\beta c^{est}$). The power term estimator computes the estimated compressor pressure ratio ($\beta c^{est}$) using a closed loop operation by computing $\beta_c^{est} = c(P_t - \eta_m P_c + P_U)$, where c is a predetermined value, $P_t$ is an amount of power generated by the engine, $P_c$ is an estimated amount of power generated by the compressor, $P_U$ is the second power value generated in a previous iteration, and $\eta_m$ is a mechanical efficiency of the compressor.

In one or more examples, computing the second power value ($P_U$) by the power term estimator module includes computing $$P_U = \frac{k_2}{c} k_1 (\beta_c^{meas} - \beta_c^{est}),$$

where $k_1$ and $k_2$ are predetermined values. The power term estimator computes the second power value ($P_U$) in response to the control module being operating in a closed loop mode.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Figure 1:
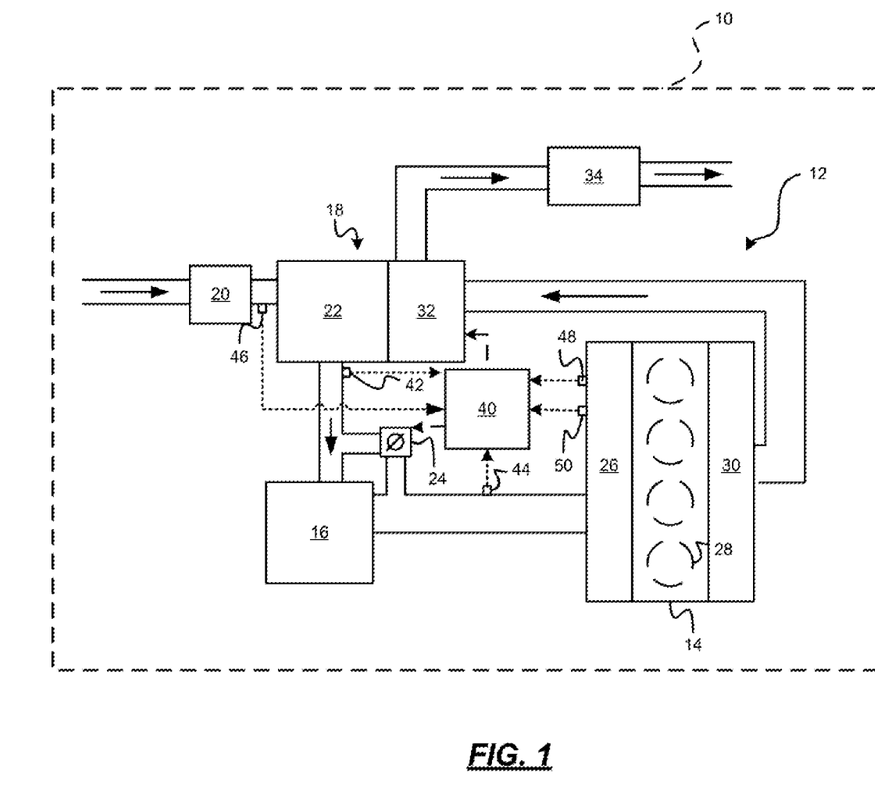
FIG. 1 depicts a vehicle including a super turbo-charged engine system.

In accordance with exemplary embodiments, in FIG. 1, a vehicle 10 is shown to include a super turbo-charged engine system 12. The engine system 12 includes an engine 14, a supercharger 16, and a turbocharger 18. As can be appreciated, the engine 14 can be a diesel engine, gasoline engine, or other engine and is not limited to the present example.

Air enters the engine 14 through an intake 20, which may include a mass airflow meter or other sensors (not shown). The air is compressed within a compressor 22 of the turbocharger 18. The turbocharger 18 may include a variable geometry turbocharger (VGT), a variable nozzle turbocharger (VNT), a variable vane turbocharger (VVT), a fixed geometry wastegate turbocharger, a sliding vane turbocharger, or another suitable type of turbocharger. For exemplary purposes the disclosure will be discussed in the context of a VVT.

A supercharger bypass valve 24 is disposed between the supercharger 16 and the turbocharger 18. When controlled to a first position (e.g., a closed position, or other position), the bypass valve 24 permits air to flow from the compressor 22 through the supercharger 16, to further compress the air. When controlled to a second position (e.g., an open position or other position), the bypass valve 24 bypasses air flowing through the supercharger and directs the air to flow through an alternate path, to prevent further compression of the air. The compressed air, from the turbocharger 18 and/or the supercharger 16, may then pass through one or more air coolers (not shown) or other conditioners (not shown) before entering the engine 14 through an intake manifold 26.

The air is combined with fuel in cylinders 28 of the engine 14 to produce drive torque. Although four cylinders 28 are illustrated, it is appreciated that engines having any number of cylinders 28 are contemplated to be within the scope of the invention, including engines having 2, 4, 5, 6, 8, 10, 12 and 16 cylinders arranged in an inline, flat, or v-type configuration. Exhaust gas exits the cylinders 28 through an exhaust manifold 30 and enters an exhaust inlet side of the turbocharger 18 that includes a turbine 32. The turbine 32 of the turbocharger 18 can be controlled to regulate the flow, the velocity, and/or the pressure of the air through the compressor 22. The exhaust gas may then flow through one or more exhaust treatment components 34 before being released to the atmosphere.

A control module 40 controls the bypass valve 24 and the turbocharger 18 based on sensed and/or modeled data. In various embodiments, the control module 40 receives various signals and controls the components according to various operating modes.

For example, a first pressure sensor 42 senses the pressure of air from the turbocharger 18 and generates a first pressure signal based thereon. A second pressure sensor 44 senses the pressure of air from the supercharger 16 and generates a second pressure signal based thereon. An air temperature sensor 46 senses a temperature of the air entering the engine system 12 and generates an intake air temperature signal based thereon. A coolant temperature sensor 48 senses a temperature of coolant fluid in the engine 14 and generates a coolant temperature based thereon. An engine speed sensor 50 senses a rotational speed of the engine and generates an engine speed signal based thereon. The control module 40 receives the signals, evaluates engine load and engine speed based on the signals, determines an operating mode based on the engine load, and controls the bypass valve 24 and/or the turbocharger 18 based on the operating mode.

Figure 2:
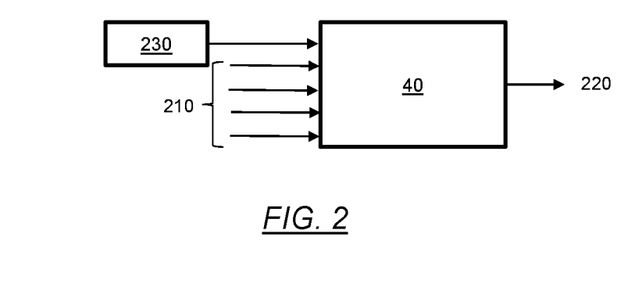
FIG. 2 depicts a dataflow diagram that illustrates various embodiments of a control system that may be embedded within a control module.

Referring now to FIG. 2, and with continued reference to FIG. 1, a dataflow diagram illustrates various embodiments of a control system that may be embedded within the control module 40. Various embodiments of control systems according to the present disclosure may include any number of sub-modules embedded within the control module 40. As can be appreciated, the sub-modules described herein may be combined and/or further partitioned to similarly control the amount of power being generated by the engine 14. Inputs to the control module 40 may be sensed from the engine system 12, received from other control modules (not shown), and/or determined/modeled by other sub-modules (not shown) within the control module.

FIG. 2 illustrates the control module 40 receiving input signals 210 including Wc, $Tc^{us}$, $p_c^{us}$, $\beta cm^{eas}$. Here, Wc is the mass flow rate of air/gas flow through the compressor 22, $Tc^{us}$ is an flow temperature in an intake duct 20 upstream of the compressor 22, $pc^{us}$ is a pressure of the air/gas flow in the intake duct upstream of the compressor 22, and $\beta c^{meas}$ is a measured pressure ratio of the compressor 22. Further, the control module 40 computes an amount of power ($P_t^{des}$) 220 that is to be generated by the turbine 32. For example, the control module 40 may be configured to control the actuators of the engine, particularly an air charging system, which includes the one or more valves and actuators of the engine 14, using a feedback linearization approach, which may be based on a multi-input-multi-output (MIMO) non-linear mathematical model of the air charging system. Accordingly, the control module 40 controls the one or more valves for fuel injection, air charging, etc. to cause the engine to generate the computed amount of power ($P_t^{des}$) 220. The amount of power ($P_t^{des}$) 220 can be computed using following equation:

$$P_t^{des} = \frac{PID}{c} + P_c(W_c, T_c^{us}, p_c^{us}, \beta_c^{meas}). \qquad \text{Eq (1)}$$

Here, PID is the output of a linear control loop that is handled by a proportional, integral, derivative controller that tracks a desired compressor pressure ratio. PID is another input term 230 received by the control module 40, and c is a constant term based on the turbocharger inertia. The control module 40 further computes the power (Pc) generated by the compressor 22 using a predetermined model of the compressor 22. The model uses the input signals 210 to estimate the compressor power Pc.

However, such computation of the desired amount of power can result in poor control performances during a transient period, such as when shifting gears, due to modeling errors. Particularly, compressor power losses are not modeled by the control module 40 in such cases. Such unmodeled power losses can cause high overboost during transient maneuvers and recovering the control module 40 with available calibration of the model-based boost control is difficult after such an overboost. The embodiments of the present invention address such technical challenges; the control module 40 models the compressor power losses at runtime using indirect measurement and processing. In one or more examples, the control module 40, during the compressor ratio control estimates an unmodeled power term ($P_U$), which represents the power that is not modeled by the control module 40 using the compressor power model (Pc). The estimation of this unmodeled power term is carried out by using a direct compressor ratio dynamic model running in parallel and converging on the actual measured pressure ratio by the usage of a closed-loop. The unmodeled power term is further used to compute the amount of power ($P_t^{des}$) 220 to be generated by the turbine 38, which reduces overboost and underboost, especially during transients.

Figure 3:
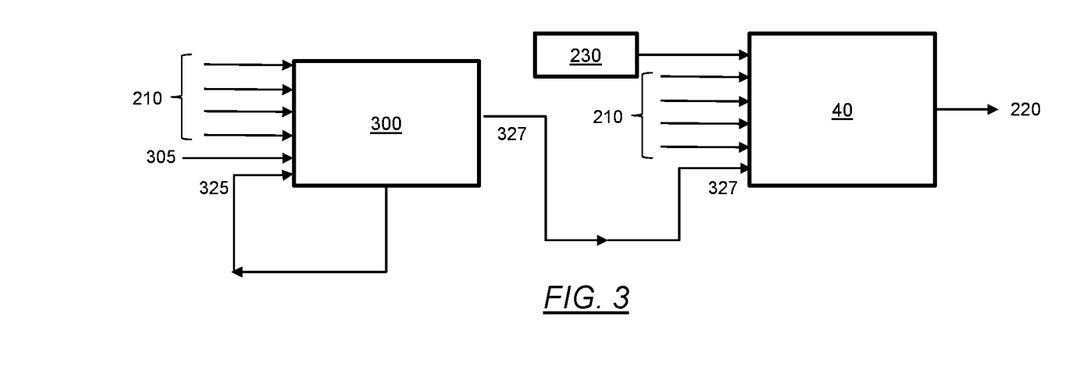
FIG. 3 depicts a dataflow diagram that illustrates various embodiments of a control system that may be embedded within the control module.

Referring now to FIG. 3, and with continued reference to FIG. 1, a dataflow diagram illustrates various embodiments of a control system that may be embedded within the control module 40. Here, the control system includes a power term estimator 300 that computes an estimated compressor pressure ratio $\beta c^{est}$ 325 for the compressor 22 using closed loop computation. The power term estimator 300 receives the input signals 210, and a power value (Pt) 305 that is being generated by the engine 14. The power term estimator 300 further receives the estimated boost compressor pressure ratio $\beta c^{est}$ 325 for use in the next iteration. The power term estimator 300 further computes the unmodeled power term $P_U$ 327 using and using a direct compressor ratio dynamic model.

The unmodeled power term $P_U$ 327 is input to the control module 40 which computes the amount of power ($P_t^{des}$) 220 to be generated by the engine 14 as:

$$P_t^{des} = \frac{PID}{c} + P_c(W_c, T_c^{us}, p_c^{us}, \beta_c^{meas}) + P_U. \qquad \text{Eq (2)}$$

Figure 4A:
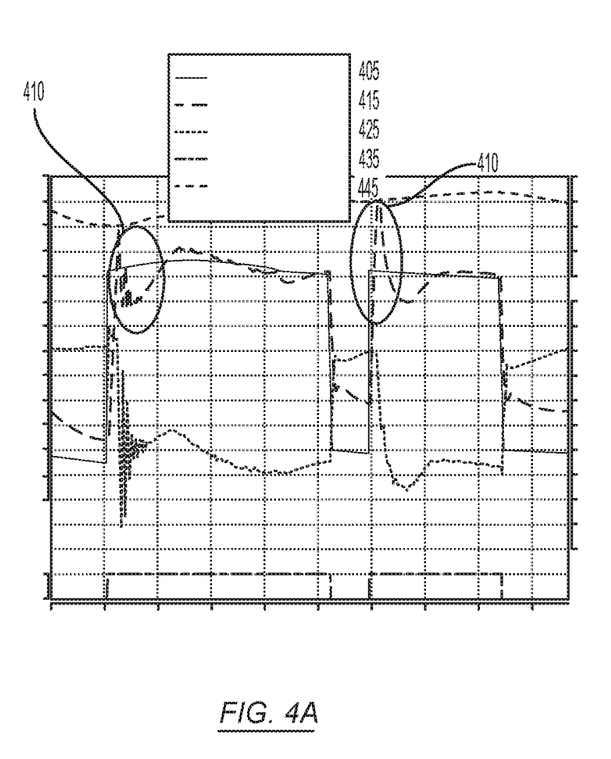
FIG. 4A and FIG. 4B depict a comparison between using and not using an unmodeled power term $P_U$ when computing an amount of power ($P_t^{des}$) to be generated by an engine.
Figure 4B:
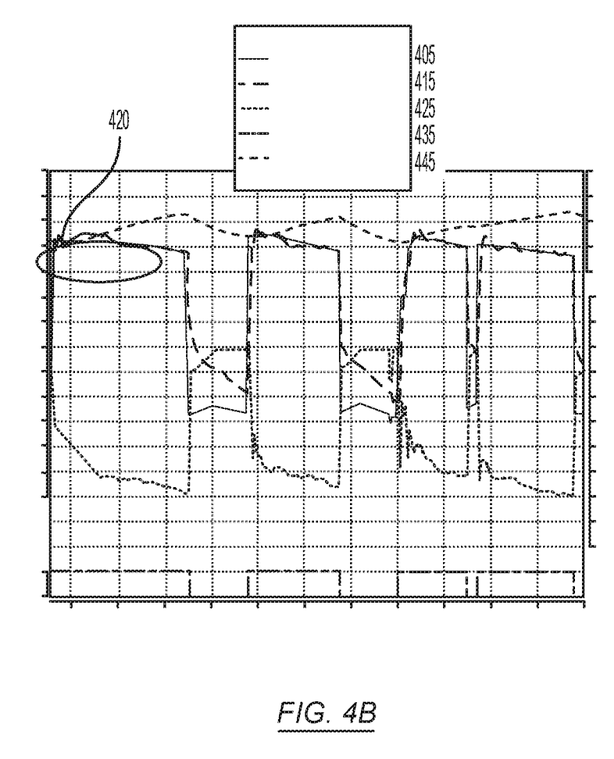

FIG. 4A and FIG. 4B depict a comparison between using and not using the unmodeled power term $P_U$ 327 when computing the amount of power ($P_t^{des}$) 220 according to one or more embodiments. Particularly, FIG. 4A depicts example results of not using the unmodeled power term $P_U$ 327 and FIG. 4B depicts example results of using the unmodeled power term $P_U$ 327 when computing the amount of power ($P_t^{des}$) 220 according to one or more embodiments. The setpoint 405 represents an amount of boost that is to be provided, the feedback 415 represents an amount of boost that is actually provided when the setpoint 405 is requested. The plots further illustrate measured actuator position 425 in case of a VGT. Further, the plots depict an operating mode 435 of the control module 40, which includes a closed loop mode or an open loop mode. The operating mode 435, in one or more examples, is a Boolean value that indicates a closed loop when the control module 40 maps the amount of power ($P_t^{des}$) 220 with the setpoint 415 by changing the VGT position 425. Further, the engine speed 445 is depicted in the plots of FIGS. 4A and 4B.

The example scenario for the depicted sample results had the engine 14 operating at 2000 RPM and 3000 RPM, however, it is understood that in other example scenarios different operating conditions than those of the example scenario depicted herein can be used.

As can be seen, the overboost and underboost conditions 410 that are seen in FIG. 4A are reduced in FIG. 4B by using the unmodeled power term $P_U$ 327 (the response 415 maps closely with the setpoint 405 in closed loop operating mode 435). Oscillations 420 that are typically seen close to a setpoint 415 of the boost to be received from the turbocharger 16. The oscillations 420 can be reduced in one or more examples by calibrating the power term $P_U$ 327 to a predetermined value.

Figure 5:
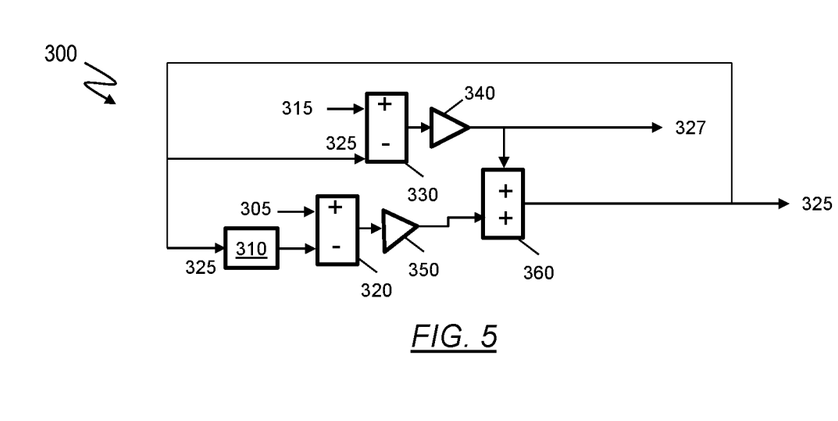
FIG. 5 illustrates a dataflow diagram of a power term estimator according to one or more embodiments.

FIG. 5 illustrates a dataflow diagram of a power term estimator according to one or more embodiments. The power term estimator 300 computes the unmodeled power term $P_U$ 327 and the estimated boost compressor pressure ratio $\beta c^{est}$ 325. The power term estimator 300 uses the estimated boost compressor pressure ratio $\beta c^{est}$ 325 from a previous iteration (t(i)) to compute the unmodeled power term $P_U$ 327 in the next iteration (t(i+1)). The power term estimator 300 computes an estimated compressor power Pc using the predetermined model of the compressor 22 that uses the input signals 210, at 310. The power term estimator 300 scales the computed compressor power Pc by $\eta_m$, which is a mechanical efficiency of the turbo-compressor 22 and 32, at 310. The power term estimator 300 further subtracts the scaled estimated compressor power Pc from the amount of power Pt 305 generated by the turbine 32 to compute (Pt−$\eta_m$Pc), at 320. In one or more examples, the result is scaled using a predetermined term c, to compute c·(Pt−$\eta_m$Pc), at 350. The predetermined term c may be a calibrateable value.

Further, the power term estimator 300 subtracts the estimated boost compressor pressure ratio $\beta c^{est}$ 325 from the previous iteration with a measured boost compressor pressure ratio $\beta c^{meas}$ 315, at 330. The result is scaled using a predetermined parameter k1 to result in k1·($\beta c^{meas}-\beta c^{est}$), at 340. Here, the predetermined value k1 is a calibrateable value.

The power term estimator 300 further adds the computed values to compute the boost compressor pressure ratio $\beta c^{est}$ 325, at 360, the computation can be expressed as:

$$\beta_c^{est}=c(P_t\eta_m P_c)+k_1(\beta_c^{meas}-\beta_c^{est}) \quad\quad \text{Eq (3)}$$

Figure 6:
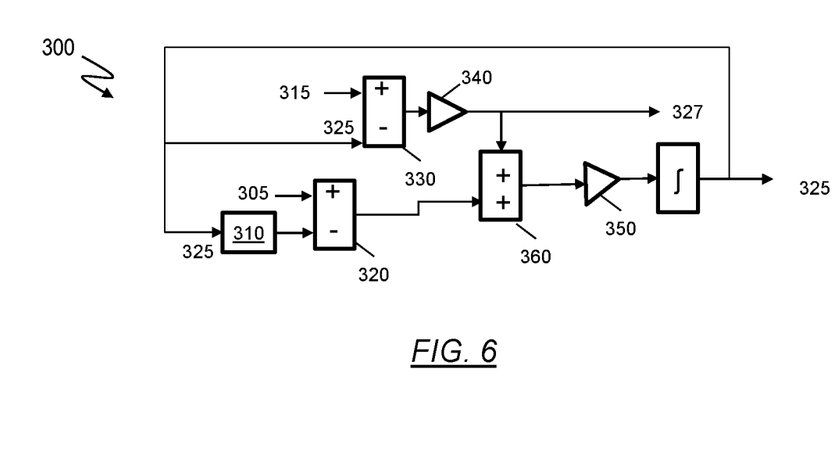
FIG. 6 depicts another dataflow diagram of a power term estimator according to one or more embodiments.

FIG. 6 depicts another dataflow diagram of a power term estimator according to one or more embodiments. The power term estimator 300 computes the unmodeled power term $P_U$ 327 and the estimated boost compressor pressure ratio $\beta c^{est}$ 325. The power term estimator 300 uses the estimated boost compressor pressure ratio $\beta c^{est}$ 325 from a previous iteration (t(i)) to compute the unmodeled power term $P_U$ 327 in the next iteration (t(i+1)). As depicted, the boost compressor pressure ratio $\beta c^{est}$ 325 in this case is computed according to an expression:

$$\beta_c^{est}=c(P_t-\eta_m P_c+P_U) \quad\quad \text{Eq (4)}$$

Here, $P_U$ can be computed as:

$$P_U = \frac{k_2}{c}k_1(\beta_c^{meas} - \beta_c^{est}) \quad\quad \text{Eq (5)}$$

Here, $k_2$ is a calibration parameter based on a correction factor $Wc^{corr}$ for the compressor mass flow. For example, $k_2=f(Wc^{corr})$ is a function that allows the calibrator to use the correction factor where it is strictly necessary in order to recover the closed loop control overshoot due to the unmodeled power term.

For example, in a system with $\eta_m=1$, and where the estimated boost compressor pressure ratio $\beta c^{est}$ 325 converges to the actual (measured) boost compressor pressure ratio $\beta c^{meas}$ 315, the estimated boost compressor pressure ratio $\beta c^{est}$ 325 is given by the expression:

$$\beta_c^{est}=cP_t-cP_c=cP_t-cc_p W_c T_c^{us} R_c(W_c^{corr}\beta_c^{est})=f(P_t, \beta_c^{est},w)$$

Here, w are other exogenous factors (e.g. $W_c$, $T_c^{us}$, etc.). Based on the above:

$$\delta\beta_c = \frac{\partial f}{\partial P_t}\delta P_t + \frac{\partial f}{\partial \beta_c}\delta\beta_c$$

$$\delta\beta_c = c\delta P_t - cc_p W_c T_c^{us}\frac{\partial R_c}{\partial \beta_c}\delta\beta_c$$

$$\delta\beta_c = c\delta P_t - cc_p W_c T_c^{us}(p_{01} + p_{11}W_c^{corr})\delta\beta_c$$

$$\Rightarrow \delta\beta_c = A\delta\beta_c + B\delta P_t,$$

where $a = -cc_p W_c T_c^{us}(p_{01} + p_{11}W_c^{corr})\delta\beta_c;$ and $b = c.$ The calibration parameter $k_2$ is correlated to the term a, which is a linearized pole (therefore the term determining the response dynamics of the system) that is a function of the corrected mass flow.

Figure 7:
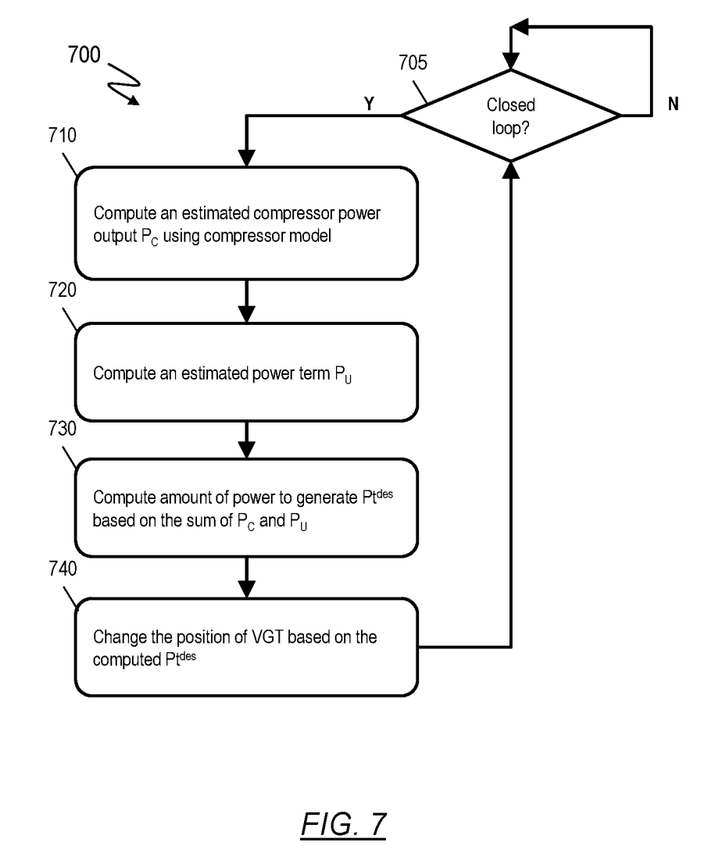
FIG. 7 depicts a flowchart for computing an amount of power to be generated in an engine according to one or more embodiments.

FIG. 7 depicts a flowchart for computing an amount of power to be generated in an engine according to one or more embodiments. A method 700 includes detecting if the control module 40 is operating in a closed loop or an open loop mode, at 705. The determination can be made based on a Boolean condition flag that indicates the operating mode. If the control module 40 is in open loop, the method 700 loops back for a next iteration without performing any computations and without changing the actuator position.

If the control module 40 is operating in the closed loop, the method 700 includes computing, at runtime, the estimated compressor power output $P_C$ using the compressor model, at 710. The computation is performed based on the input signals 210, and is a known technique. The method 700 further includes computing an estimated power term $P_U$ dynamically, at runtime, at 720. The computation is performed in parallel with the computation of the compressor power output $P_C$ to determined unmodeled power terms in the computation of the compressor power. Computing the unmodeled power term includes computing an estimated boost compressor pressure ratio and converging the estimate to a boost compressor pressure ratio measurement using a closed loop.

The method 700 further includes computing the amount of power 220 to be generated based on the compressor power output $P_C$ and the estimated power term $P_U$, at 730. In one or more examples, the amount of power 220 is computed as a sum of the terms along with a third term PID/c. The method 700 further includes the control module 40 changing piston positions in the engine 14 and/or the turbocharger 16 to cause generation of the amount of power 220, at 740.

Accordingly, the control system facilitates computing the unmodeled power term at runtime to be included when computing the amount of power to be generated by the engine 14. By using the unmodeled power term, the control module computes a more accurate amount of power to be generated compared to control modules that do not use the estimated power term. The embodiments of the present invention provide an improvement to generation of power in an engine system 12. Further, the embodiments of the present invention cause components of the engine system 12 to change positions, such as piston positions, and/or cause one or more valves of the engine system 12 to open/close to generate an amount of power computed by a control module. As described herein, features described herein facilitates the control module 40 to provide an improved power generation and addresses the technical challenges described herein regarding poor control performances during transient due to modeling errors.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A control system for a vehicle, the control system comprising:
a control module configured to dynamically compute a first power value ($P_C$) to be generated by a compressor based on an estimation model of the compressor;
a pressure sensor configured to senses a pressure of air from the compressor;
a power term estimator module configured to dynamically compute a second power value ($P_U$) based on a measured compressor pressure ratio ($\beta c^{meas}$) of the compressor, the measured compressor pressure ratio ($\beta c^{meas}$) based at least in part on the pressure sensed by the pressure sensor;
the control module further configured to compute an amount of power to be generated by an engine ($Pt^{des}$) by adding the first power value and the second power value; and
the control module configured to adjust an actuator position to generate the amount of power to be generated.

2. The control system of claim 1, wherein the control module is further configured to compute the amount of power to be generated by the engine by adding a third power value (PID) to the first power value ($P_C$) and the second power value ($P_U$).

3. The control system of claim 1, wherein the power term estimator module computes the second power value ($P_U$) in parallel with the first power value ($P_C$).

4. The control system of claim 1, wherein computing the second power value ($P_U$) by the power term estimator module comprises computing an estimated compressor pressure ratio ($\beta c^{est}$).

5. The control system of claim 4, wherein the power term estimator computes the estimated compressor pressure ratio ($\beta c^{est}$) using a closed loop operation by computing $\beta c^{est} = c(P_t - \eta_m P_c + P_U)$, where c is a predetermined value, $P_t$ is an amount of power generated by the engine, $P_c$ is an estimated amount of power generated by the compressor, $P_U$ is the second power value generated in a previous iteration, and $\eta_m$ is a mechanical efficiency of the compressor.

6. The control system of claim 4, wherein computing the second power value ($P_U$) by the power term estimator module comprises computing $$P_U = \frac{k_2}{c} k_1 (\beta_c^{meas} - \beta_c^{est}),$$

where $k_1$ and $k_2$ are predetermined values.

7. The control system of claim 1, wherein the power term estimator computes the second power value ($P_U$) in response to the control module being operating in a closed loop mode.

8. A method for generating power by an engine, the method comprising:
providing engine components of the engine;
determining operating conditions of the engine;
computing, by a control module, a first power value ($P_C$) to be generated by a compressor based on an estimation model of the compressor;
sensing, by a pressure sensor, pressure values across the compressor;
computing, by a power term estimator module, a second power value ($P_U$) based on an estimated power compressor pressure ratio ($\beta c^{est}$) based on an actual compressor pressure ratio ($\beta c^{meas}$) of the compressor, the measured compressor pressure ratio ($\beta c^{meas}$) based at least in part on the pressure values across the compressor;
computing, by the control module, an amount of power to be generated by the engine ($P_t^{des}$) by adding the first power value and the second power value; and
adjusting, by the control module, a piston position to generate the amount of power to be generated.

9. The method of claim 8, further comprising:
computing, by the control module, the amount of power to be generated by the engine by adding a third power value (PID) to the first power value ($P_C$) and the second power value ($P_U$).

10. The method of claim 8, wherein the second power value ($P_U$) is computed by the power term estimator module in parallel with the computation of the first power value ($P_C$) by the control module.

11. The method of claim 8, wherein computing the second power value ($P_U$) by the power term estimator module comprises computing an estimated compressor pressure ratio ($\beta c^{est}$) of the compressor.

12. The method of claim 11, wherein the estimated compressor pressure ratio ($\beta c^{est}$) is computed using a closed loop operation by computing $\beta_c^{est} = c(P_t - \eta_m P_c + P_U)$, where c is a predetermined value, $P_t$ is an amount of power generated by the engine, $P_c$ is an estimated amount of power generated by the compressor, $P_U$ is the second power value generated in a previous iteration, and $\eta_m$ is a mechanical efficiency of the compressor.

13. The method of claim 11, wherein computing the second power value ($P_U$) by the power term estimator module comprises computing $$P_U = \frac{k_2}{c} k_1 (\beta_c^{meas} - \beta_c^{est}),$$

where $k_1$ and $k_2$ are predetermined values.

14. The method of claim 8, further comprising:
determining that the control module is operating in a closed loop mode, and responsively computing the second power term ($P_U$) by the power term estimator computes.

15. An engine system comprising:
an engine; and
a turbocharger comprising a compressor;
a control module; and
a power term estimator module; wherein:
a pressure sensor configured to senses a pressure of air from the compressor;
the control module dynamically computes a first power value ($P_C$) to be generated by the compressor based on an estimation model of the compressor;
the power term estimator module dynamically computes a second power value ($P_U$) based on an actual compressor pressure ratio ($\beta c^{est}$) of the compressor, the measured compressor pressure ratio ($\beta c^{meas}$) based at least in part on the pressure sensed by the pressure sensor;
the control module computes an amount of power to be generated by the engine system ($P_t^{des}$) by adding the first power value and the second power value; and
the control module adjusts a piston position to generate the amount of power to be generated.

16. The engine system of claim 15, wherein the power term estimator module computes the second power value ($P_U$) in parallel with the first power value ($P_C$).

17. The engine system of claim 15, wherein computing the second power value ($P_U$) by the power term estimator module comprises computing an estimated compressor pressure ratio ($\beta c^{est}$) of the compressor.

18. The engine system of claim 17, wherein the power term estimator computes the estimated compressor pressure ratio ($\beta c^{est}$) using a closed loop operation by computing $\dot{\beta}_c^{est} = c(P_t - \eta_m P_c + P_U)$, where c is a predetermined value, $P_t$ is an amount of power generated by the engine, $P_c$ is an estimated amount of power generated by the compressor, $P_U$ is the second power value generated in a previous iteration, and $\eta_m$ is a mechanical efficiency of the compressor.

19. The engine system of claim 17, wherein computing the second power value ($P_U$) by the power term estimator module comprises computing $$P_U = \frac{k_2}{c} k_1 (\beta_c^{meas} - \beta_c^{est}),$$

where $k_1$ and $k_2$ are predetermined values.

20. The engine system of claim 15, wherein the power term estimator computes the second power value ($P_U$) in response to the control module being operating in a closed loop mode.

* * * * *